United States Patent
Jyogataki et al.

(10) Patent No.: US 6,192,251 B1
(45) Date of Patent: Feb. 20, 2001

(54) COMMUNICATION SYSTEM HAVING A NOTIFICATION FUNCTION WITH RESPECT TO A PREDETERMINED STATE OF EACH COMMUNICATION TERMINAL THEREOF

(75) Inventors: Takashi Jyogataki, Hamura; Shinjiro Ishida, Iruma, both of (JP)

(73) Assignee: Casio Computer Co., Ltd., Tokyo (JP)

( * ) Notice: Under 35 U.S.C. 154(b), the term of this patent shall be extended for 0 days.

(21) Appl. No.: 09/085,518

(22) Filed: May 27, 1998

(30) Foreign Application Priority Data

May 29, 1997 (JP) .................................................. 9-139772

(51) Int. Cl.[7] .................................................. H04Q 7/20
(52) U.S. Cl. .......................... 455/466; 455/456; 455/414
(58) Field of Search .................................. 455/466, 456, 455/458, 414

(56) References Cited

U.S. PATENT DOCUMENTS

| | | | | |
|---|---|---|---|---|
| 5,153,582 | * | 10/1992 | Davis | 340/825.44 |
| 5,406,616 | | 4/1995 | Bjorndahl | 379/59 |
| 5,539,924 | * | 7/1996 | Grube et al. | 455/34.1 |
| 5,748,100 | * | 5/1998 | Gutman et al. | 340/825.44 |
| 5,894,596 | * | 4/1999 | Hayes, Jr. | 455/418 |
| 5,996,651 | * | 10/1999 | Sibecas | 455/412 |

OTHER PUBLICATIONS

Patent Abstracts of Japan, vol. 010, No. 329 (E–452), Nov. 8, 1986 & JP 61 134157 A (NEC Corp.), Jun. 21, 1986 –Abstract–.

* cited by examiner

*Primary Examiner*—Fan Tsang
*Assistant Examiner*—Blane J. Jackson
(74) *Attorney, Agent, or Firm*—Frishauf, Holtz, Goodman, Langer & Chick, P.C.

(57) ABSTRACT

When a recall mode is selected as the operation mode of a PHS terminal, recall data is generated. The recall data specifies the other PHS terminal, a state wherein another terminal enters a specific service area, and a message, for example, that the other party has arrived in the specific service area which is to be received from a server or the other terminal when the other terminal is set in the designated state. The recall data is set in the subaddress of a call set-up message and registered in the server or the PHS terminal. When the other terminal enters the specific service area, the server or the other terminal transmits the message to the PHS terminal in the recall mode. The PHS terminal displays the transmitted message on a display device. The user of the PHS terminal can thus know that the user of the other terminal has arrived in the specific service area and that communication with the other terminal is enabled. The state of the other terminal can therfore be recognized without requiring any operation on the part of the other party.

16 Claims, 9 Drawing Sheets

FIG.3

| PROTOCOL ID | CALL NUMBER | MESSAGE TYPE | FACILITY | CALLER NUMBER | CALLER SUBADDRESS | CALLEE NUMBER | CALLEE SUBADDRESS |

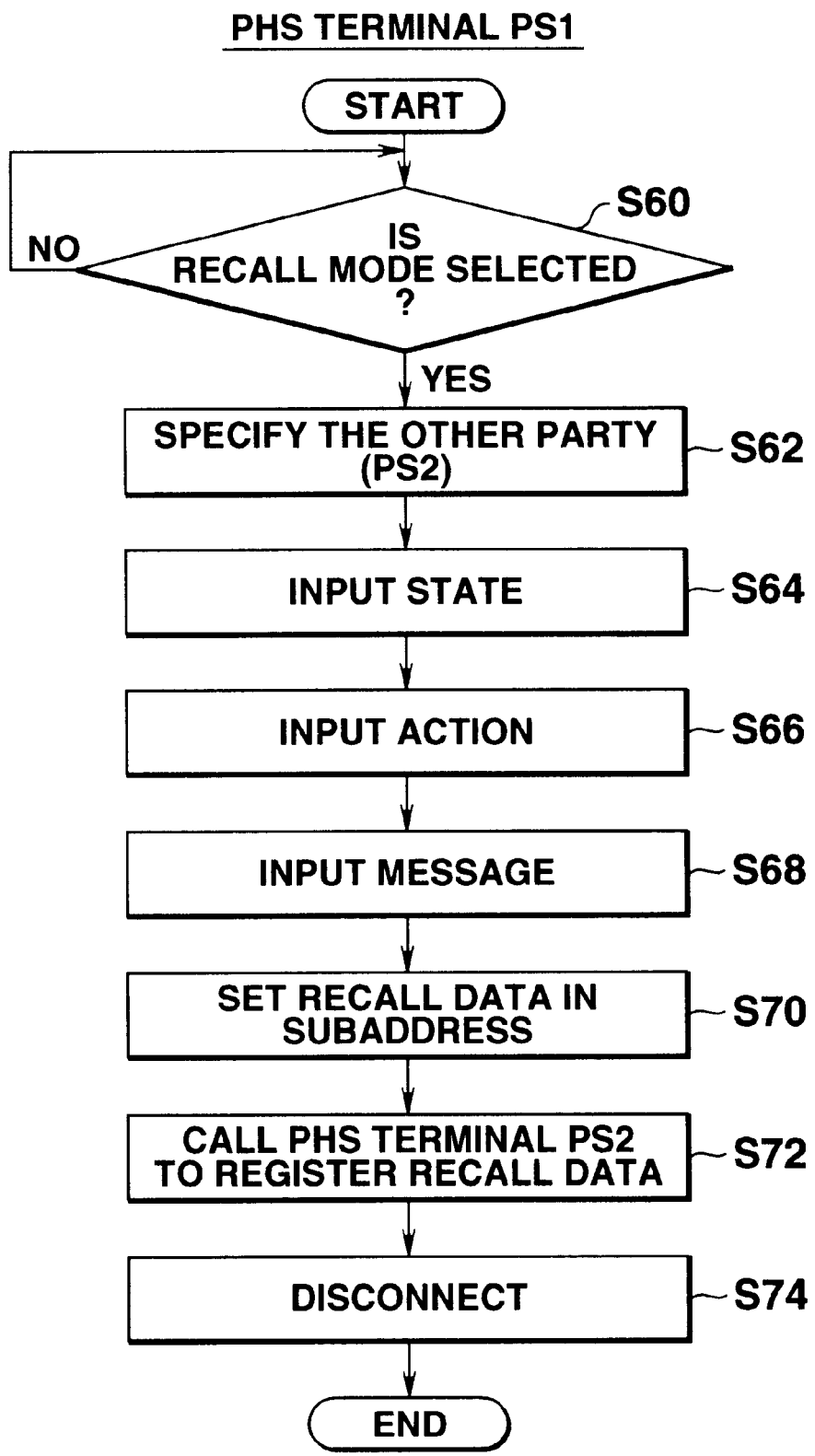

COMMUNICATION SYSTEM HAVING A NOTIFICATION FUNCTION WITH RESPECT TO A PREDETERMINED STATE OF EACH COMMUNICATION TERMINAL THEREOF

BACKGROUND OF THE INVENTION

The present invention relates to a communication system and, more particularly, to a communication system which frequently detects the state of each communication terminal and notifies the user of a given communication terminal upon detecting that a predetermined other communication terminal is set in a designated state.

This application is based on Japanese Patent Application No. 9-139772, filed May 29, 1997, the content of which is incorporated herein by reference.

In recent years, a known mobile communication system is constituted by portable information terminals (e.g., a cellular telephone, a PHS terminal: Personal Handy Phone System terminal, a pager, and a PDA: Personal Digital Assistants) the users carry to transmit/receive speech data and the like to/from another terminal such as a general home telephone, and by a base station connected to a communication line such as an ISDN line to communicate with the portable information terminals and connect them to the communication line.

In this mobile communication system, a public base station connected to a public switched telephone network and set indoors or outdoors at an unspecified location, a private base station connected to a switching unit (to be referred to as a PBX hereinafter) placed in a public facility (e.g., an office), or a private master unit set in a house and functioning as the master unit of a portable information terminal is used as a base station. The public base station, private base station and private master unit are referred to a master unit hereinafter. The portable information terminal (to be also referred to as a subsidiary unit hereinafter) is connected to the communication line through the public base station, the private base station, or the private master unit to communicate with the other party.

The portable information terminal is driven by a secondary battery or the like and used as a portable unit. In the service area of the master unit, the portable information terminal is connected to the communication line through the master unit connected via a wireless channel so that the portable information terminal can communicate with another terminal. Outside the service area of the master unit, the portable information terminal is connected to the communication line through an outdoor base station connected via a wireless channel to communicate with another terminal. Information to be transmitted/received by the portable information terminal includes speech data, text data, image data, and the like.

In the conventional mobile communication system, when a user wants contact from the other party when he/she has arrived at or left a certain place or he/she is set in a predetermined state, the user depends on the memory of the other party. If the other party forgets, no contact can be made. In this case, it is troublesome that the user must request the other party to make a call. The above problem, moreover, is not limited to a mobile communication system, but may also occur in a general communication system.

BRIEF SUMMARY OF THE INVENTION

Accordingly, it is an object of the present invention to provide a communication system which can detect that a predetermined communication terminal is set in a designated state, and which can notify a user of another communication terminal of the designated state of the predetermined communication terminal.

In order to achieve the above object, according to a first aspect of the present invention, there is provided a communication system which performs communication between terminals connected to a communication network via a wireless channel or a wired channel under the control of a management station for managing the communication network, wherein one of the terminals generates calling information and predetermined state information for notifying a state of the other terminal and transmits the pieces of information to the management station, and the management station stores the calling information of the terminal, which has transmitted the pieces of information, and the predetermined state information for notifying the state of the other terminal, and when the state of the other terminal equals the predetermined state information, calls the terminal on the basis of the calling information.

According to a second aspect of the present invention, there is provided a communication system which performs communication between terminals connected to a communication network via a wireless channel or a wired channel, wherein one of the terminals generates calling information and predetermined state information for notifying a state of the other terminal and transmits the pieces of information to the other terminal, and the other terminal stores the transmitted calling information and the transmitted predetermined state information, and when a self state equals the predetermined state information, calls the terminal on the basis of the stored calling information.

According to a third aspect of the present invention, the state of the other terminal may preferably be notified to the terminal using one of character data and speech data in notification based on the calling information.

According to a fourth aspect of the present invention, the transmitted calling information may preferably contain a caller number of a call set-up message, and the predetermined state information may contain data inserted in a subaddress area of the call set-up message.

According to a fifth aspect of the present invention, the predetermined state may preferably contain a state wherein the other terminal enters or leaves a predetermined area.

According to a sixth aspect of the present invention, the predetermined area preferably may be a service area of a public base station set on the communication network to connect the terminal to the communication network via a wireless channel, or an electromagnetic wave reachable range of a master unit connected to the communication network and having a function of connecting at least a terminal which has been registered in advance to the communication network via a wireless channel.

According to a seventh aspect of the present invention, the predetermined state may preferably be a predetermined time.

According to an eighth aspect of the present invention, there is provided a communication apparatus connected to a communication network via a wireless channel or a wired channel, comprising storage means for storing other party information sent from the communication network and notification information containing a predetermined state for notifying a state of the communication apparatus itself, and means for, when a current state of the communication apparatus equals the predetermined state stored in the storage means, notifying the state on the basis of the other party information.

According to a ninth aspect of the present invention, the notification means may preferably notify the state of the communication apparatus to the other party using one of character data and speech data on the basis of the other party information.

According to a tenth aspect of the present invention, the other party information sent through the communication network may preferably contain a caller number of a call set-up message, and the predetermined state information for notifying the state of the communication apparatus itself may contain data inserted in a subaddress area of the call set-up message.

According to an eleventh aspect of the present invention, the predetermined state may preferably contain a state wherein the communication apparatus enters or leaves a predetermined area.

According to a twelfth aspect of the present invention, the predetermined area may preferably be a service area of a public base station set on the communication network to connect the communication apparatus to the communication network via a wireless channel, or an electromagnetic wave reachable range of a master unit connected to the communication network and having a function of connecting at least a communication apparatus which has been registered in advance to the communication network via a wireless channel.

According to a thirteenth aspect of the present invention, the predetermined state may preferably be a predetermined time.

According to a fourteenth aspect of the present invention, the notification information may preferably further contain a notification method, and the notification means may notify the state to the other party on the basis of the notification method.

Additional objects and advantages of the present invention will be set forth in the description which follows, and in part will be obvious from the description, or may be learned by practice of the present invention.

The objects and advantages of the present invention may be realized and obtained by means of the instrumentalities and combinations particularly pointed out hereinbefore.

BRIEF DESCRIPTION OF THE SEVERAL VIEWS OF THE DRAWING

The accompanying drawings, which are incorporated in and constitute a part of the specification, illustrate presently preferred embodiments of the present invention and, together with the general description given above and the detailed description of the preferred embodiments given below, serve to explain the principles of the present invention in which:

FIG. 3 is a view for explaining a call set-up message transferred between a terminal and a base station;

FIG. 7 is a flow chart for explaining the operation of a PHS terminal upon selecting a recall mode in a mobile communication system according to a second embodiment of the present invention;

DETAILED DESCRIPTION OF THE INVENTION

A preferred embodiment of a communication system according to the present invention will now be described with reference to the accompanying drawings.

First Embodiment

Figure 1:
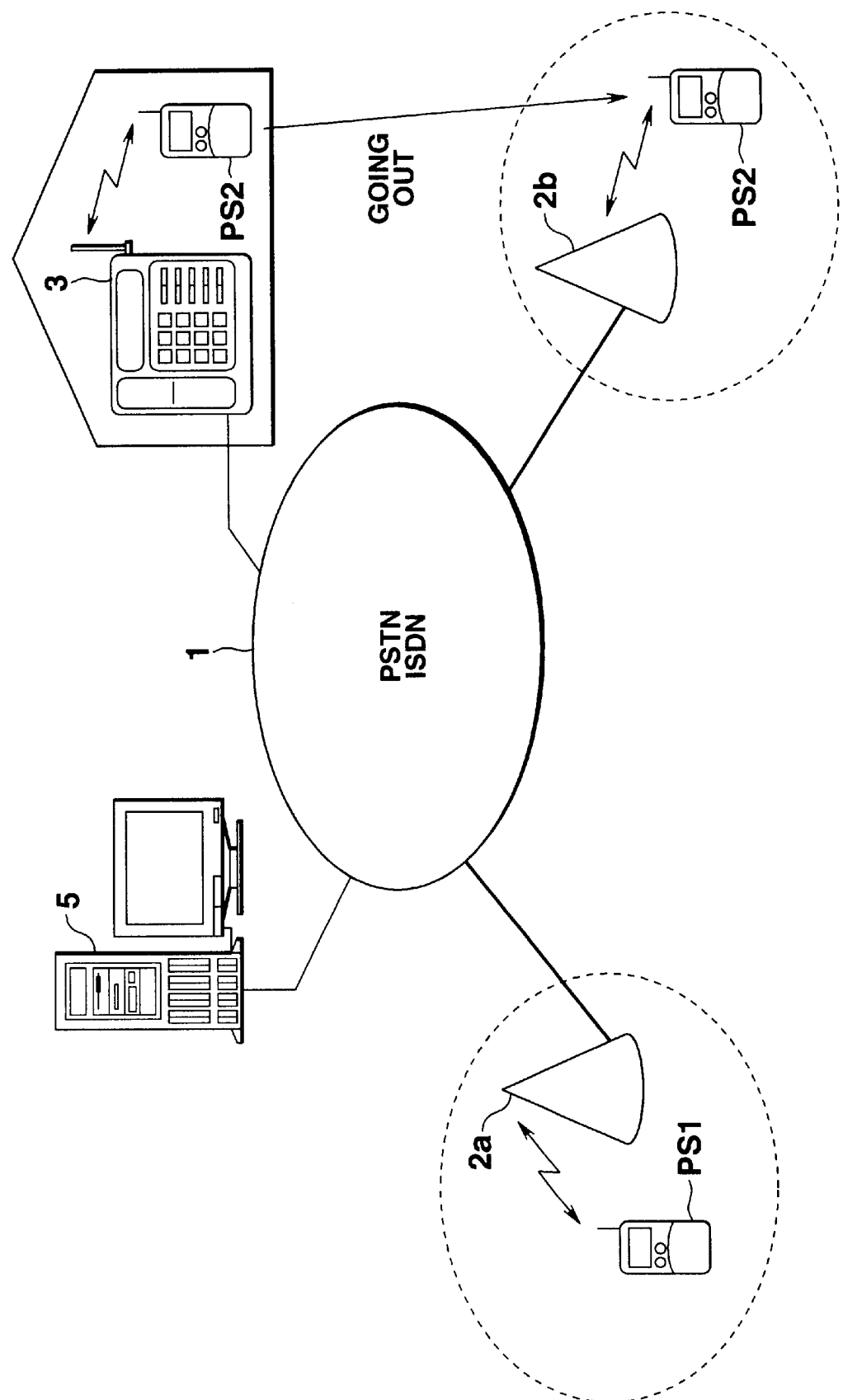
FIG. 1 is a block diagram showing the entire arrangement of a mobile communication system according to a first embodiment of the present invention.

FIG. 1 is a block diagram showing the entire arrangement of a system of the first embodiment in which the present invention is applied to a PHS.

Referring to FIG. 1, reference numeral 1 denotes a public switched telephone network (PSTN) or an integrated service digital network (ISDN) spread throughout a region. Such a network 1 will be referred to as a communication network hereinafter. Public base stations 2a, 2b, . . . connected to the communication network 1 are set outdoors at a predetermined interval. Each public base station has a service area (electromagnetic wave reachable range: service area—in the broken line shown in FIG. 1) with a radius of several hundred meters around itself and serves as a repeater station connected to each of PHS terminals PS1, PS2, . . . in the service area via a wireless channel to connect the PHS terminal to the communication network 1. A master unit 3 is set in a house and connected to the communication network 1. The master unit 3 has a handset, dial keys, and various function keys, like a normal telephone set, and allows communication with an external telephone set. The master unit 3 communicates with the PHS terminal PS2 via a wireless channel to connect an external call to the PHS terminal PS2. In addition, the master unit 3 connects the PHS terminal PS2 to another telephone or PHS terminal on the communication network 1 in response to a connection request from the PHS terminal PS2.

Each of the PHS terminals PS1, PS2, . . . is carried by a user and driven by a battery. The PHS terminal PS1 or PS2 has a liquid crystal display unit and dial keys, i.e., the same functions as those of a normal telephone set and communicates with the master unit 3 or the public base station 2a or 2b via a wireless channel so as to be connected to the communication network 1. In other words, in the service area of the master unit 3, each of the PHS terminal PS1, PS2, . . . communicates with the master unit 3 via a wireless channel so as to be connected to the communication network 1. Outside the service area of the master unit 3, each of the PHS terminal PS1, PS2, . . . communicates with the public base station 2a or 2b set at a close position via a wireless channel so as to be connected to the communication network 1 to communicate with another telephone set or the master unit.

The terminal (it can be not only a PHS terminal but also a master unit or a normal telephone set) of the present invention has a recall mode in which when a specific party (it can be a PHS terminal, a master unit or a normal telephone set) is set in a specific state, the user of the terminal is notified of it. To set this mode, identification information for identifying the other party, state designation information for designating the state of the other party to be notified, and notification operation designation information for designating contents to be notified in the designated state (these pieces of information will be called recall data) are set in the caller or callee subaddress to originate a call. The recall data is registered in a server 5 connected to the communication network 1. The server 5 determines whether the state of the other party equals the state designated by the state designation information contained in the recall data. If the states equal each other, an action corresponding to the notification operation designation information contained in the recall data, e.g., notification of a message representing the state of the other party is performed.

More specifically, the recall data includes a caller number for identifying the terminal where the recall mode is selected and performing recall, the other party ID for identifying the other party, state designation information for designating the state of the other party to be notified in the recall, action designation information for designating contents of the recall in the designated state, and if notification of a message is designated, the message. A recall message has contents representing the entering/leaving state of the other party for the service area of the public base station or master unit, e.g., "Mr. X has arrived at Y station", "Mr. X has arrived at Z company", "Mr. X has left home (office)", "Mr. X has come home", "it is TT: MM", "please call Mr. X", "Is it OK to call Mr. X?".

As a designated state, the other party "enters a specific service area, i.e., area defined by a specific CS-ID", "leaves a specific service area", "enters a specific master unit area", or "leaves a specific master unit area", or "it is the designated time". A designated action is e.g., a message notification method: "transmit a message as character information", "transmit a message as speech information", "transmit a message as character information and generate a melody", or "generate a simple buzzer sound".

The server 5 controls the communication network 1 to manage communication between terminals. Especially, in the present invention, the server 5 receives recall data from the terminal set in the recall mode and determines on the basis of the location information of the other party whether the state of the other party equals a predetermined state designated by the state designation information contained in the recall data. If the states equal each other, the server 5 performs an action corresponding to the notification operation designation information contained in the recall data, e.g., notification of a message representing the state of the other party. The server 5 may be a network management station which stores various data in a database and provides various services to provide the data to the user in response to a request from the PHS terminal.

Figure 2:
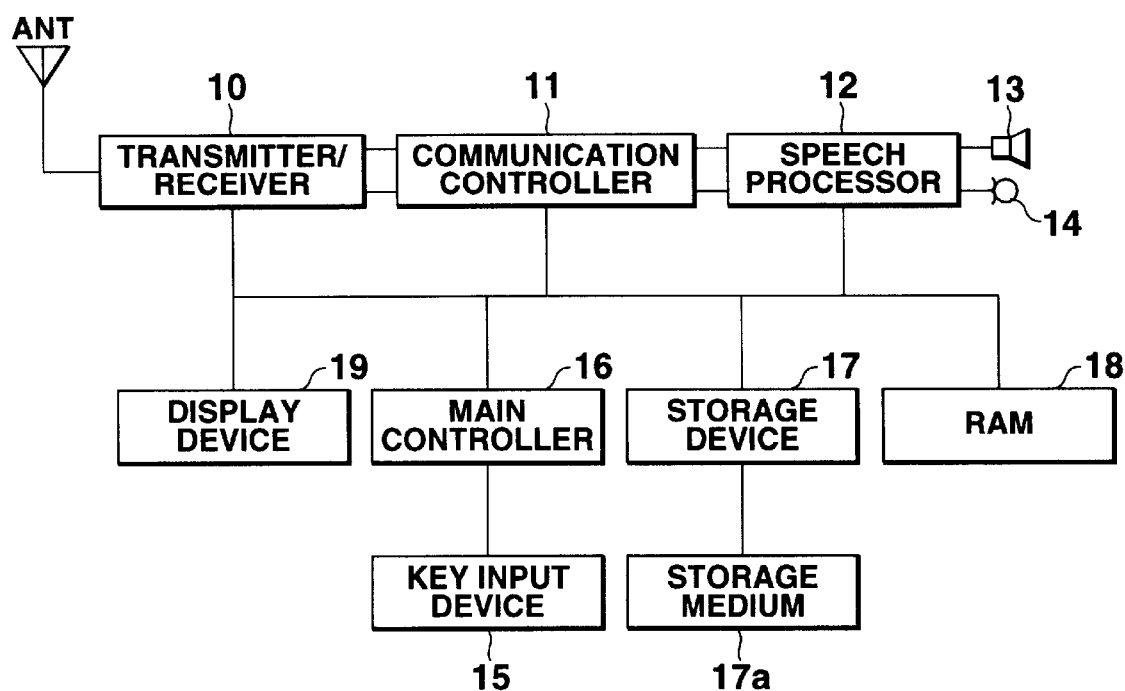
FIG. 2 is a block diagram showing the arrangement of a PHS terminal as a portable terminal of the first embodiment.

FIG. 2 is a block diagram showing the arrangement of the public base station 2a or 2b according to the first embodiment.

A transmitter/receiver 10 has a frequency conversion section and a modem. The receiver of the frequency conversion section mixes a signal received at an antenna ANT with a local oscillation signal with a predetermined frequency, which is output from a PLL synthesizer, thereby converting the received signal in the 1.9 GHz band to an IF (Intermediate Frequency) signal near the 1 MHz band. The transmitter of the frequency conversion section mixes a modulated wave based on the $\pi/4$ shift QPSK, which is output from a modem (to be described later), with a local oscillation signal with a predetermined frequency, which is output from the PLL synthesizer, thereby converting the frequency to the 1.9 GHz band and sends it from the antenna ANT through an antenna switch. The receiver of the modem demodulates the IF signal from the frequency conversion section, separates the signal into I and Q data, and sends the data string to a communication controller 11. The transmitter of the modem generates I and Q data from data supplied from the communication controller 11, modulates it on the basis of the $\pi/4$ shift QPSK, and sends the data to the frequency conversion section of the transmitter/receiver 10.

The communication controller 11 performs frame synchronization and slot data format processing. The receiver section of the communication controller 11 extracts data of one slot from the received data supplied from the modem of the transmitter/receiver 10 at a predetermined timing and extracts a unique word (synchronization signal) from this data, thereby generating a frame synchronization signal. The receiver portion descrambles the control data portion and the speech data portion. The control data is sent to a main controller 16, and the speech data is sent to a speech processor 12. The transmitter section of the communication controller 11 adds control data and the like to speech data supplied from the speech processor 12, scrambles the data, and adds a unique word to generate transmission data of one slot. The transmission data is inserted into a predetermined slot in a frame at a predetermined timing and sent to the modem of the transmitter/receiver 10.

The speech processor 12 is constituted by a speech codec and a PCM codec. The speech codec compresses/expands digital data. The receiver section of the speech processor 12 decodes an ADPCM (Adaptive Differential Pulse Code Modulation) speech signal (4 bits×8 KHz=32 Kbps) supplied from the communication controller 11 to expand the speech signal which is a PCM (Pulse Code Modulation) speech signal (8 bits×8 KHz=64 Kbps), and outputs the signal to the PCM codec. The transmitter section of the speech processor 12 codes a PCM speech signal supplied from the PCM codec into an ADPCM speech signal to compress the PCM speech signal, and sends the signal to the communication controller 11. The above-described PCM codec performs analog/digital conversion. On the receiver section, a PCM speech signal supplied from the speech codec is converted into an analog speech signal by D/A conversion and output from a loudspeaker 13. On the transmitter section, an analog speech signal input from a microphone 14 is converted into a PCM speech signal by A/D conversion and sent to the speech codec.

A key input device 15 has number keys used to input the telephone number of the other party, an on-hook/off-hook switch, a volume switch for adjusting the speech output, a mode switch for selecting the recall mode as an operation mode, and the like. The states of the keys and switches are supplied to the main controller 16.

The main controller 16 controls the entire apparatus in accordance with a predetermined program. A storage device 17 has a storage medium 17a storing a program to be executed by the main controller 16 and various parameters. This storage medium 17a comprises a magnetic or optical storage medium or a semiconductor memory. This storing medium 17a is fixedly arranged or detachably attached in the storage device 17. The program and parameters to be stored in the storage device 17 may be received from another device connected through a communication line and stored. Alternatively, the storage device having the storage medium may be arranged on the side of another device connected through a communication line such that the program and parameters stored in the storage medium can be downloaded through the communication line. A RAM 18 stores data generated under the control of the main controller 16 or is used as a working area.

A display device 19 has a liquid crystal display device for displaying various data such as an operation mode, a telephone number, and a communication time, and LEDs for indicating ON/OFF of a switch or the like. The display device 19 displays various data under the control of the controller 16. The display device 19 comprises as a touch panel, and data can be input by touching a displayed icon or data with a touch pen (not shown).

FIG. 3 is a view for explaining a call set-up message. The call set-up message is information to be transferred between the caller-side terminal and the callee-side terminal (an external telephone set, a master unit, or a PHS terminal) when the terminal of the communication system originates a call or receives a call. The call set-up message has a protocol ID, a call number, a message type, a facility as another information element, a caller number, a caller subaddress, a callee number, and a callee subaddress. In the present invention, a terminal (it is not limited to a PHS terminal) which wants to know that a specific other party (it is also not limited to a PHS terminal) is set in a specific state selects the recall mode. Recall data constituted by identification information for identifying the other party, state designation information for designating a specific state, and action designation information for designating a notification to be received are generated and set in the caller or callee subaddress, and then, the terminal calls the other party. The present invention is not limited to this. As far as the recall data can be sent, it may be set in, e.g., a facility message or an optional message.

The operation of the mobile communication system according to the first embodiment will be described. This operation is executed on the basis of the program and parameters stored in the storage medium 17*a* in the form of program codes readable by the CPU in the main controller 16. The operations of the communication itself are the same as those of a conventional terminal, and a detailed description thereof will be omitted.

Figure 4:
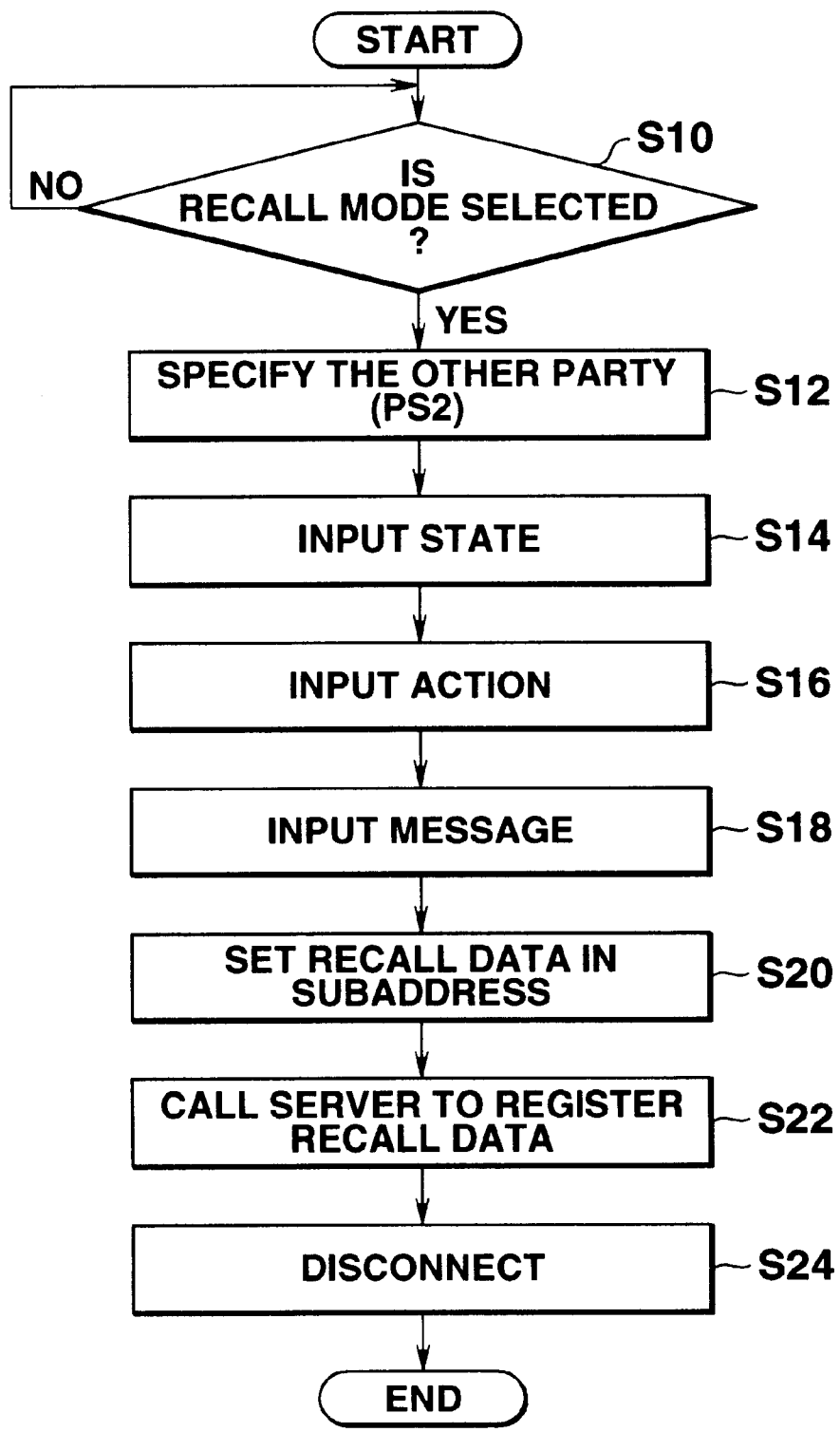
FIG. 4 is a flow chart for explaining the operation of the PHS terminal upon selecting a recall mode of the first embodiment.
Figure 5:
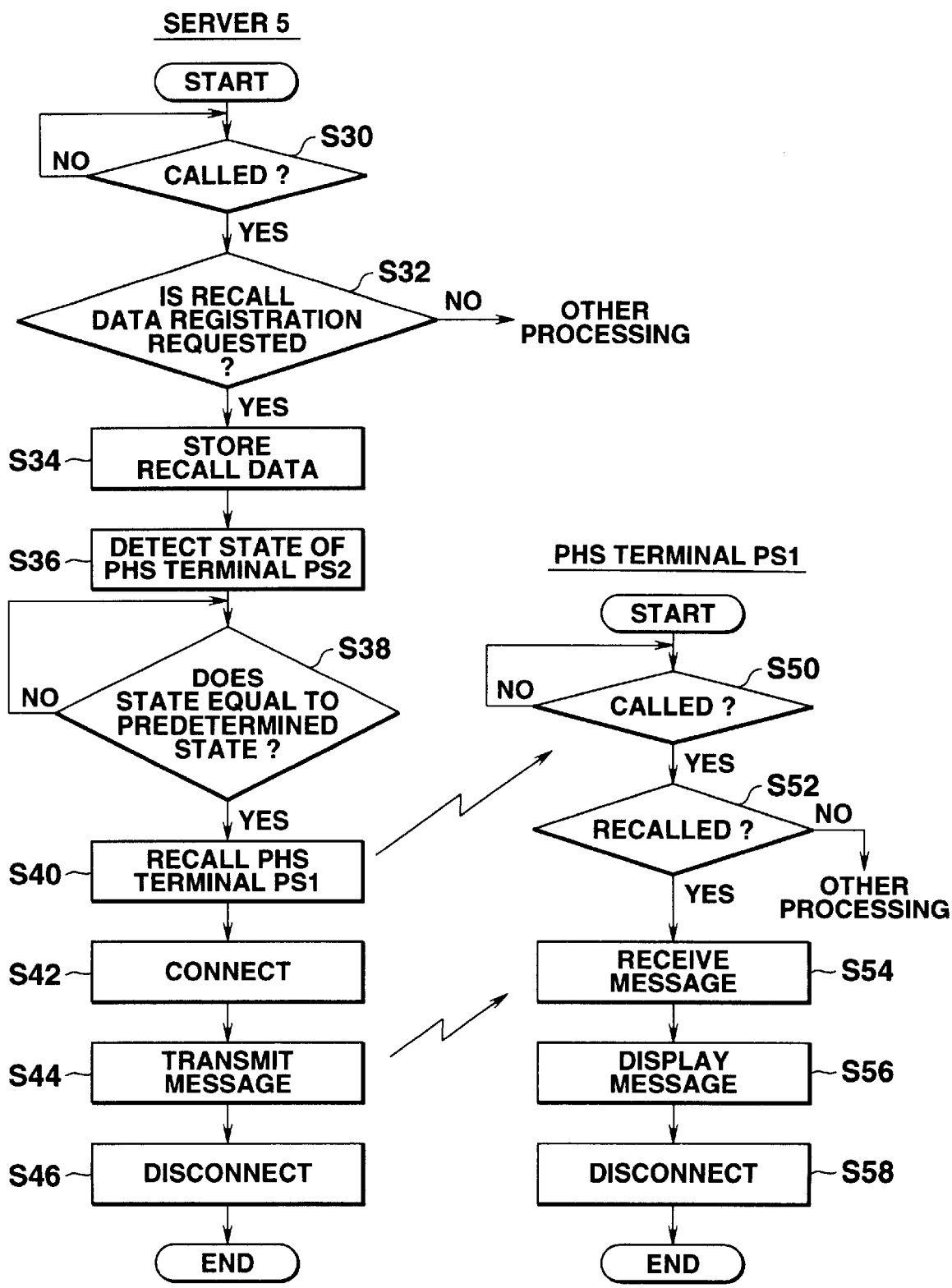
FIG. 5 is a flow chart for explaining the operation of a server and the operation of the PHS terminal in the recall mode which is performed when a specified communication terminal is set in a designated state in the first embodiment.
Figure 6A:
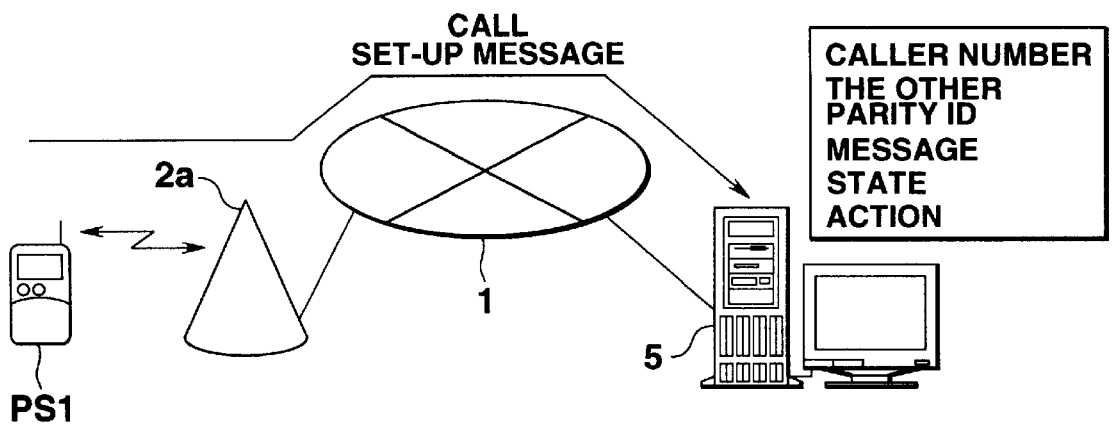
FIGS. 6A, 6B and 6C are schematic views for explaining the operation of the mobile communication system according to the first embodiment.
Figure 6B:
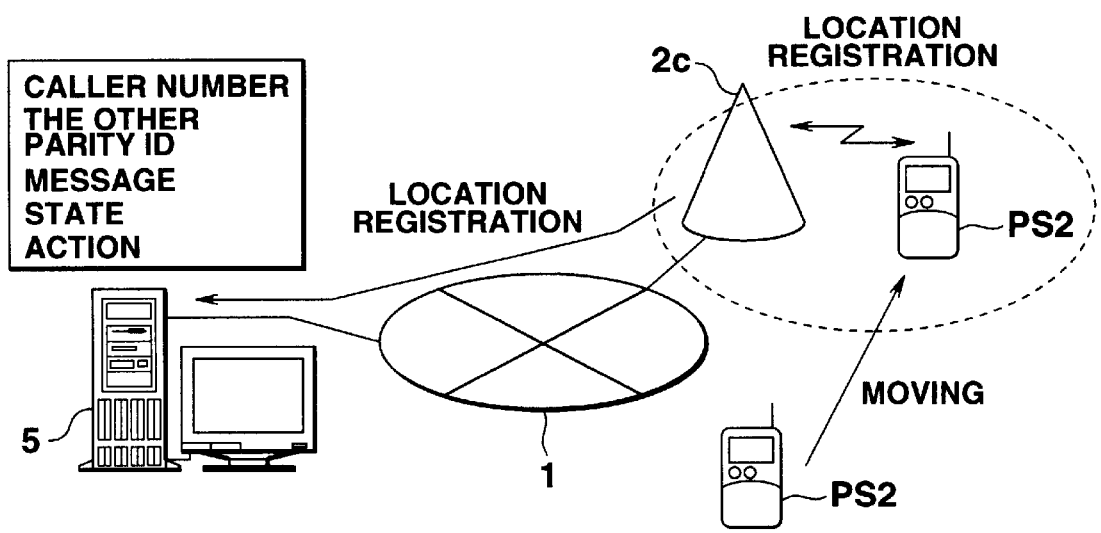
Figure 6C:
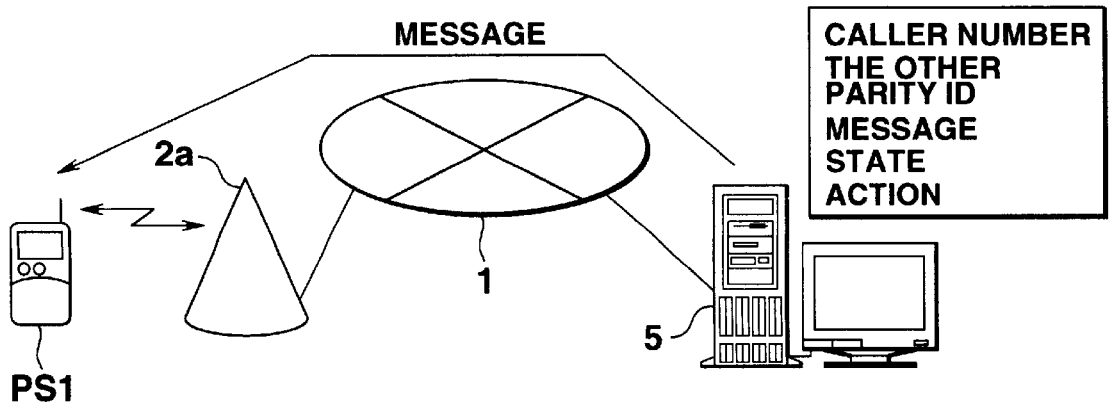

FIG. 4 is a flow chart for explaining the operation of the PHS terminal upon selecting the recall mode in the first embodiment. FIG. 5 is a flow chart for explaining the operation of the server 5 and the operation of the PHS terminal in the recall mode which is performed when the state of the other party equals a predetermined state in the first embodiment. FIGS. 6A to 6C are schematic views for explaining the operation of the entire mobile communication system according to the first embodiment. In the following description, the PHS terminal PS1 shown in FIG. 1 is the terminal set in the recall mode, and the PHS terminal PS2 is the other party.

In step S10 in FIG. 4, the PHS terminal PS1 determines whether the recall mode is selected. If YES in step S10, the flow advances to step S12. The recall mode is selected in accordance with an instruction from the key input device 15. In step S14, the other party whose state is to be known is specified. The other party is specified by inputting a terminal ID, e.g., a telephone number or PS-ID, which has been set for each terminal in advance. In this case, the PHS terminal PS2 is specified. Not only one but also a plurality of terminals can be specified.

In step S14, a state is input. In this case, the above-described state wherein the PHS terminal PS2 "enters a specific service area corresponding to a specific CS-ID or area information, (the service area of a public base station 2*c* shown in FIG. 6B)" is input. It is to be noted that the Y station is located in the service area of the public base station 2*c*.

In step S16, an action to be executed by the server when the above state is satisfied is input. In this case, an action of "transmitting a predetermined message representing the state of the other party as character information" is input.

In step S18, this predetermined message is input. In this case, a message "Mr. X (the user of the other party PS2) has arrived at Y station" is input. If buzzer or melody sound generation is input as the action at step S16, it is not necessary to input a message at step S18.

In step S20, the above information, i.e., recall data is set in the subaddress shown in FIG. 3. In step S22, the server 5 is called to transmit a call set-up message in which the recall data is set, as shown in FIG. 6A. Upon receiving a registration confirmation message, the communication channel is disconnected in step S24, and recall mode setting processing is ended.

In step S30 in FIG. 5, the server 5 determines whether it is called. If YES in step S30, it is determined in step S32 whether the call is a recall data registration request. If NO in step S32, the flow advances to other processing.

If YES in step S32, the flow advances to step S34 to store, as recall data, the caller number, the other party ID (PS2), the message, the state, and the action set in the subaddress of the call set-up message.

In step S36, the location information of the PHS terminal PS2 as the other party is acquired on the basis of the other party ID. Generally, the PHS terminal registers its location through the public base station when the PHS terminal moves to another service area or the power is turned on. Therefore, the server 5 can detect the current location of the PHS terminal.

In step S38, it is determined whether the state of the PHS terminal PS2 as the other party equals the predetermined or designated state. If NO in step S38, i.e., if it is determined on the basis of the location information of the PHS terminal PS2 acquired in step S36 that the PHS terminal PS2 is outside the service area of the public base station 2*c*, processing in step S38 is repeatedly executed until the states equal each other.

When the states equal each other, i.e., the PHS terminal PS2 enters the service area of the public base station 2*c* shown in FIG. 6B, the flow advances to step S40 to call the caller number (PHS terminal PS1) stored as recall data. In step S42, the communication channel is connected.

In step S44, the message is transmitted to the PHS terminal PS1 in accordance with the action designated by the action designation information stored as recall data, as shown in FIG. 6C. In step S46, the communication channel is disconnected, and processing is ended.

In step S50, the PHS terminal PS1 set in the recall mode determines whether it is called. If YES in step S50, it is determined in step S52 whether the PHS terminal PS1 is recalled. If NO in step S52, the flow advances to other processing (e.g., the off-hook state is detected, and normal communication processing is performed).

If YES in step S52, the flow advances to step S54 to receive the message transmitted from the server 5, "Mr. X has arrived at Y station". In step S56, the received message is displayed on the display device 19. In step S58, processing is ended.

When a plurality of other parties are specified, location information of all other parties are acquired in step S36. In step S38, it is determined whether the state of each other party equals the designated state. If any party is set in the designated state, the PHS terminal PS1 is recalled. After recall, the flow returns to step S36 without disconnecting the line.

When only a buzzer or melody sound is to be generated without sending a message, recall notification is simply made in step S44. In step S56, the buzzer or melody sound is generated in accordance with the recall notification.

As described above, according to the first embodiment, the user of the PHS terminal PS1 in the recall mode can know that (the user of) the PHS terminal PS2 as the designated other communication party enters a predetermined service area, i.e., the user of the PHS terminal PS2 has arrived at Y station without forcing the user of the other party to perform an operation. The PHS terminal PS2 can be called on the basis of this notification, resulting in an increase in convenience.

Other embodiments of the present invention will be described next. The same reference numerals as in the first embodiment denote the same parts in the other embodiments, and a detailed description thereof will be omitted.

Second Embodiment

A mobile communication system according to the second embodiment has the same arrangement as that shown in FIG. 1, and a detailed description thereof will be omitted. In the second embodiment, recall data sent from the PHS terminal PS1 in the recall mode is registered not in the server 5 but directly in the other party PS2. The other party PS2 itself determines whether the self state equals a predetermined state designated by the state designation information contained in the recall data. If the state equals the designated state, an operation designated by the action designation information contained in the recall data, e.g., an operation of transmitting a message representing the self state is performed for the terminal PS1 in the recall mode. Therefore, the server 5 can be omitted.

Figure 8:
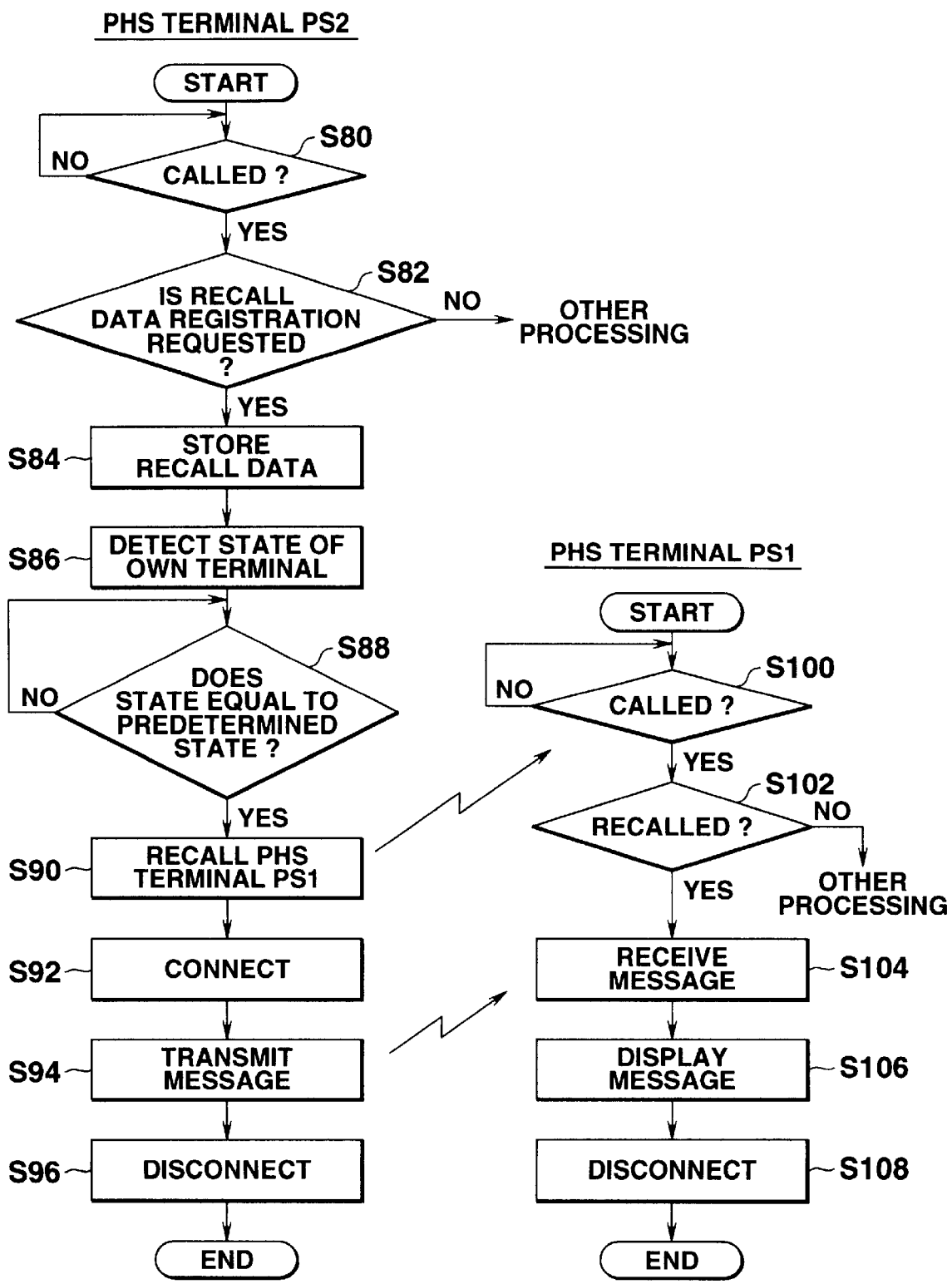
FIG. 8 is a flow chart for explaining the operation of a specified communication terminal and the operation of the PHS terminal in the recall mode which is performed when the specified communication terminal is set in a designated state in the second embodiment.
Figure 9A:
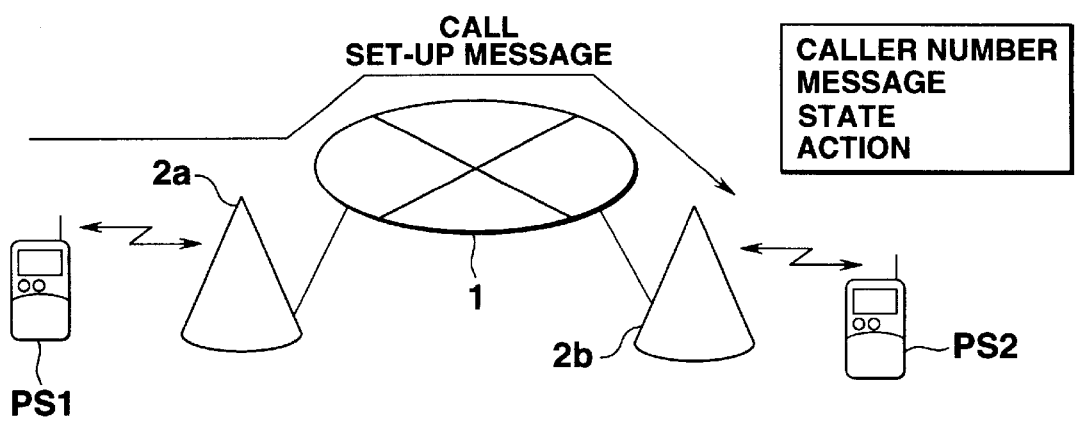
FIGS. 9A, 9B and 9C are schematic views for explaining the operation of the mobile communication system according to the second embodiment.
Figure 9B:
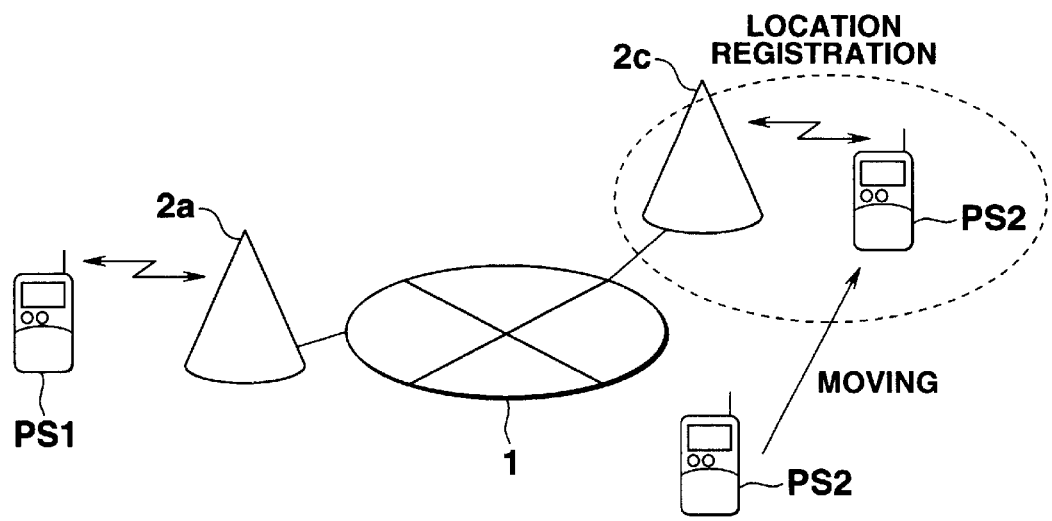
Figure 9C:
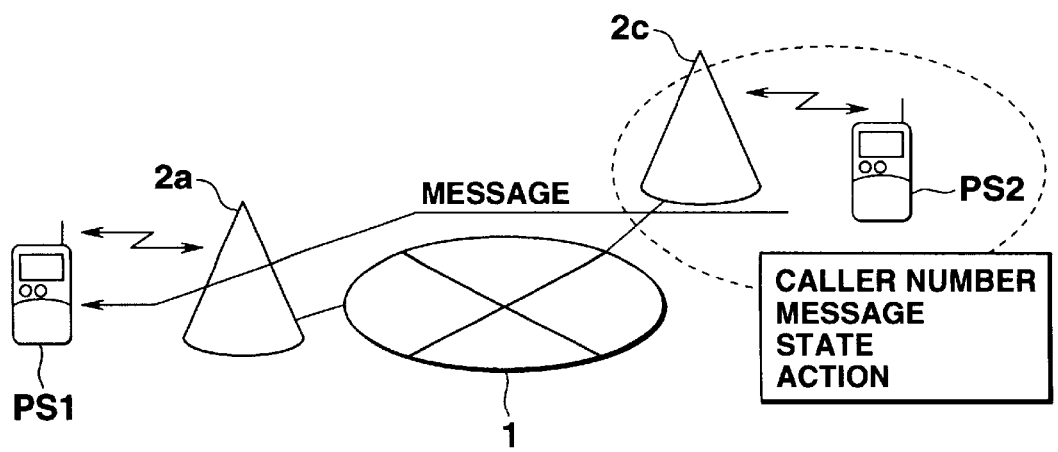

FIG. 7 is a flow chart for explaining the operation of the PHS terminal PS1 in the recall mode according to the second embodiment. FIG. 8 is a flow chart for explaining the operation of the other party PS2 and the operation of the PHS terminal PS1 in the recall mode which is performed when the state of the other party equals the designated state in the second embodiment. FIGS. 9A to 9C are schematic views for explaining the operation of the entire mobile communication system according to the second embodiment.

In step S60 in FIG. 7, the PHS terminal PS1 determines whether the recall mode is selected. If YES in step S60, the flow advances to step S62.

In step S62, the other party (PHS terminal PS2) is specified.

In step S64, the state is input. In this case, the above-described state wherein the PHS terminal PS2 "enters a specific service area corresponding to a specific CS-ID or area information, (the service area of a public base station 2c shown in FIG. 9B)" is input.

In step S66, an action to be executed by the other party PS2 when the above state is satisfied is input. In this case, an action of "transmitting a message as character information and simultaneously generating a melody" is input.

In step S68, the message is input. In this case, a message "please call Mr. X (the user of the other party PS2 specified in step S62)" is input.

In step S70, the above information, i.e., recall data is set in the subaddress shown in FIG. 3. In step S72, the other party PS2 is called to transmit a call set-up message in which the recall data is set, as shown in FIG. 9A. Upon receiving a registration confirmation message, the communication channel is disconnected in step S74, and processing is ended.

In step S80 in FIG. 8, the PHS terminal PS2 as the other party determines whether it is called. If YES In step S80, it is determined in step S82 whether the call is a recall data registration request. If NO in step S82, the flow advances to other processing.

If YES in step S82, the flow advances to step S84 to store, as recall data, the caller number, the message, the state, and the action set in the subaddress of the call set-up message.

In step S86, the state of the own terminal is detected from the base station or master unit.

In step S88, it is determined whether the self state equals the designated state. The state designated by the PHS terminal PS1 is "the PHS terminal PS2 enters the service area of a specific CS-ID (public base station 2c)". If NO in step S88, i.e., if it is determined on the basis of the self location information acquired in step S86 that the PHS terminal PS2 itself has not entered the service area of the public base station 2c, step S88 is repeatedly executed until the states equal each other.

When the states equal each other, i.e., the PHS terminal PS2 enters the service area of the public base station 2c, as shown in FIG. 9B, the flow advances to step S90 to call the caller number stored as the recall data. In step S92, the communication channel is connected. In step S94, the message is transmitted to the PHS terminal PS1 in the recall mode in accordance with the action designated by the action designation information stored as the recall data, and at the same time, a melody generation request is transmitted. In step S96, the communication channel is disconnected, and processing is ended.

In step S100, the PHS terminal PS1 in the recall mode determines whether it is called. If YES in step S100, in step S102, it is determined that the call is a recall.

If YES in step S102, the flow advances to step S104 to receive the message transmitted from the PHS terminal PS2, i.e., "please call Mr. X". In step S106, the received message is displayed on the display device 19, and a melody is generated from the loudspeaker 13. In step S108, processing is ended.

As described above, according to the second embodiment as well, the user of the PHS terminal PS1 in the recall mode can know that (the user of) the PHS terminal PS2 as the specified party enters a predetermined service area without forcing the user of the other party to perform an operation. The PHS terminal PS2 can be called on the basis of this notification, resulting in an increase in convenience.

As has been described above, according to the present invention, the terminal connected to the communication network via a wireless channel or a wired channel generates the calling information of the terminal and predetermined state information for notifying the state of the other terminal and transmits these pieces of information to a management station. Upon receiving the pieces of information, the management station calls the terminal on the basis of the calling information when the state of the other terminal equals the state designated by the predetermined state information. The state of the other terminal can be detected without requiring any operation to the other party.

The terminal connected to the communication network via a wireless channel or a wired channel generates the calling information of the terminal and predetermined state information for notifying the state of the other terminal and transmits these pieces of information to the other terminal. Upon receiving the pieces of information, the other terminal calls the terminal on the basis of the calling information when the state of the other terminal equals the predetermined state designated by the predetermined state information. The state of the other portable information terminal can be detected without requiring any operation to the other party.

In addition, since the state of the other terminal is notified using character or speech data, the state of the other portable information terminal can be visually or auditorily known without requiring any operation to the other party.

The transmitted calling information contains the caller number of a call set-up message. The predetermined state information is data inserted in the subaddress area of the call set-up message. Therefore, with a simple arrangement using an existing system, the state of the other portable information terminal can be detected without requiring any operation to the other party.

The predetermined state means that the other terminal enters or leaves a predetermined area. Therefore, the state wherein the other terminal enters or leaves the predetermined area can be detected without requiring any operation to the other party.

The predetermined area is the service area of a public base station set on the communication network to connect the terminal to the communication network via a wireless channel or the electromagnetic wave reachable range of a master unit connected to the communication network and having a function of connecting the terminal which has been registered in advance to the communication network via a wireless channel. Therefore, the state wherein the other terminal enters or leaves the service area of a predetermined public base station or the electromagnetic wave reachable range of the master unit can be detected without requiring any operation to the other party.

When the predetermined state is a predetermined time, the terminal is called by the management station or the other terminal at that time. Therefore, the predetermined time can be detected without requiring any operation to the other party.

The communication apparatus connected to the communication line stores other party information sent through the communication line and notification information containing a predetermined state for notifying the state of the communication apparatus itself. When the state of the communication apparatus equals the stored predetermined state, this state is notified to the other party. Therefore, the state of the communication apparatus can be notified in response to a request from the other party.

In addition, since the state of the communication apparatus is notified using character or speech data, the state of the communication apparatus can be visually or auditorily notified in response to a request from the other party.

The other party information transmitted through the communication network contains the caller number of a call set-up message. The predetermined state for notifying the state of the communication apparatus itself is data inserted in the subaddress area of the call set-up message. Therefore, the state of the communication apparatus can be easily notified in response to a request from the other party.

The predetermined state means that the communication apparatus enters or leaves a predetermined area. Therefore, the state wherein the communication apparatus enters or leaves the predetermined area can be notified in response to a request from the other party.

The predetermined area is the service area of a public base station set on the communication network to connect the communication apparatus to the communication network via a wireless channel or the electromagnetic wave reachable range of a master unit connected to the communication network and having a function of connecting the communication apparatus which has been registered in advance to the communication network via a wireless channel. Therefore, the state wherein the communication apparatus enters or leaves the service area or the area of the master unit can be notified in response to a request from the other party.

When the predetermined state is a predetermined time, the communication apparatus can notify the predetermined time in response to a request from the other party.

The notification information further contains a notification method. Notification is made on the basis of this notification method. The notification method can be changed in accordance with a request from the other party.

Additional advantages and modifications will readily occur to those skilled in the art. Therefore, the present invention in its broader aspects is not limited to the specific details, representative devices, and illustrated examples shown and described herein. Accordingly, various modifications may be made without departing from the spirit or scope of the general inventive concept as defined by the appended claims and their equivalents. In the above embodiments, the other party enters a predetermined service area. However, a state wherein the other party leaves a predetermined service area or leaves (goes out from) the service area of the master unit 3 can also be detected.

In the above embodiments, a PHS terminal is set in the recall mode. However, the terminal is not limited to this. The above embodiments can also be realized with a conventional wired telephone having message input and display functions.

What is claimed is:

1. A communication system which performs communication between a first terminal and a second terminal via a communication network under control of a management station for managing said communication network, wherein:

said first terminal includes a transmitter which transmits to the management station recall data including an ID of said second terminal and state information specifying a predetermined state of said second terminal; and said management station includes a memory which stores the recall data and a transmitter which sends to said first terminal a notification when said second terminal has entered the predetermined states;

and wherein the predetermined state is a state in which said second terminal enters or leaves one of: (i) a predetermined service area of a public base station of said communication network set to connect said terminals to said communication network via a wireless channel, and (ii) an electromagnetic wave reachable range of a master unit connected to said communication network and having a function of connecting at least a predetermined terminal which has been registered in advance to said communication network.

2. A system according to claim 1, wherein said notification comprises one of character data and speech data indicating that said second terminal has entered the predetermined state.

3. A system according to claim 1, wherein said first terminal transmits the recall data inserted in a subaddress area of a call set-up message.

4. A communication system which performs communication between a first terminal and a second terminal via a communication network, wherein:

said first terminal includes a transmitter which transmits to the second terminal recall data including an ID of said second terminal and state information specifying a predetermined state of said second terminal; and said second terminal includes a memory which stores the recall data and a transmitter which sends to said first terminal a notification when said second terminal has entered the predetermined state;

and wherein the predetermined state is a state in which said second terminal enters or leaves one of: (i) a predetermined service area of a public base station of said communication network set to connect said terminals to said communication network via a wireless channel, and (ii) an electromagnetic wave reachable range of a master unit connected to said communication network and having a function of connecting at least a predetermined terminal which has been registered in advance to said communication network.

5. A system according to claim 4, wherein said notification comprises one of character data and speech data indicating that said second terminal has entered the predetermined state.

6. A system according to claim 4, wherein said first terminal transmits the recall data inserted in a subaddress area of a call set-up message.

7. A communication apparatus connected to a communication network, said communication apparatus comprising:

a receiver configured to receive recall data including an ID of a caller sending the recall data and state information specifying a predetermined state of said communication apparatus;

a memory configured to store said recall data received by said receiver; and a transmitter configured to send to said caller a notification when said communication apparatus has entered the predetermined state, in accordance with the recall data stored in said memory;

wherein the predetermined state is a state in which said communication accaratus enters or leaves a predetermined area; and wherein the predetermined area is one of: (i) a service area of a public base station of said communication network set to connect said communication apparatus to said communication network via a wireless channel, and (ii) an electromarnetic wave reachable range of a master unit connected to said commnunication network and having a function of connecting at least a communication apparatus which has been registered in advance to said communication network via a wireless channel.

8. An apparatus according to claim 7, wherein said notification comprises one of character data and speech data indicating that said communication apparatus has entered the predetermined state.

9. An apparatus according to claim 7, said recall data is transmitted by being inserted in a subaddress area of a call set-up message.

10. An apparatus according to claim 7, wherein the recall data further comprises a notification method, and said transmitter sends the notification in accordance with the notification method.

11. A method for controlling a communication system comprising a first terminal and a second terminal connected to a communication network and a management station for managing said communication network, said method comprising:

transmitting recall data to one of the management station and said second terminal from said first terminal, said recall data including an ID of said second terminal and state information specifying a predetermined state of said second terminal;

storing the recall data in one of the management station and said second terminal; and sending to said first terminal a notification when said second terminal has entered the predetermined state.

12. A method according to claim 11, wherein said recall data further comprises action designation information for designating how to send the notification.

13. A method according to claim 12, wherein said action designation information designates a message display.

14. A method according to claim 12, wherein said action designation information designates a speech output.

15. A method according to claim 12, wherein said action designation information designates and alarm tone output.

16. A method according to claim 11, wherein said first terminal transmits the recall data inserted in a subaddress area of a call set-up message which contains a protocol identifier, a call number, a message type, a facility, a caller number, a caller subaddress, a callee number and a callee subaddress.

* * * * *